United States Patent Office

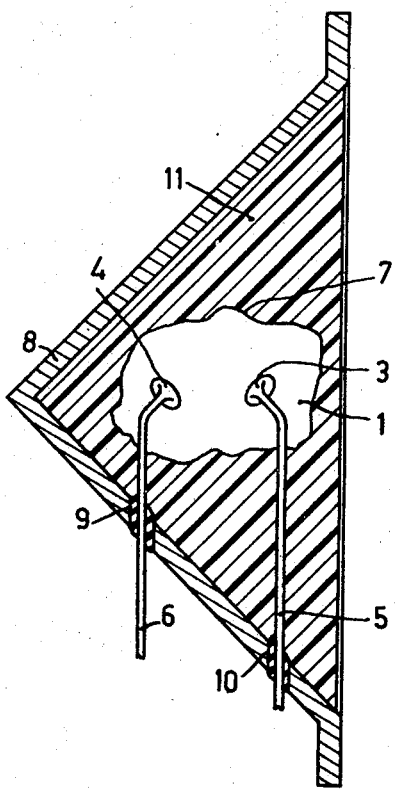

3,544,827
Patented Dec. 1, 1970

3,544,827
MOUNTING FOR SEMICONDUCTOR RADIANT ENERGY SOURCE
Petrus Johannes Julius Witterick, Emmasingel, Eindhoven, Netherlands, assignor, by mesne assignments, to U.S. Philips Corporation, New York, N.Y., a corporation of Delaware
Filed Oct. 9, 1967, Ser. No. 673,707
Claims priority, application Netherlands, Oct. 7, 1966, 6614122
Int. Cl. H01j $1/62$, $63/04$
U.S. Cl. 313—108
5 Claims

ABSTRACT OF THE DISCLOSURE

A tiny semiconductor element, with electrode means, which is structured to emit light by electron-hole injection and recombination, is compactly mounted in the interior of a reflector by transparent casting means having a refractive index exceeding about 1.1. The semiconductor element is oriented in the interior of the reflector so as to concentrate the emitted radiation in a uniform direction with minimum energy loss. According to the preferred embodiment, the invention comprises a plate of gallium phosphide mounted in the interior of a conical reflector so that the principal optical axis of the reflector lies in or parallel to the major surfaces of the plate.

---

The invention relates to an electroluminescent source of radiation, more particularly to a source of radiation which operates with injection-recombination radiation in a semiconductor material. Such a source of radiation can be used as a compact light source of very low light intensity; light is then emitted through a comparatively small surface of the semiconductor material. The semiconductor material used is preferably a material pertaining to the group of the $A^{III}B^{V}$-compounds. Especially GaP may have a comparatively high radiation efficiency.

A source of radiaiton of the said kind has very small dimensions, is extremely vulnerable and it can be mounted only with great difficulty in panels or the like, also due to the fact that the current conductors merging from these light sources are extremely weak.

The invention has for an object to provide means by which on the one hand mounting of this kind of sources of radiation in panels or the like is simplified and on the other hand the effective radiation of the source is increased so that the source can be used as an indicator or signal lamp.

According to the invention, the known source of radiation is embedded in a mass of transparent material having a refractive index preferably in excess of 1.1, a preferably conical reflecting body being provided along a large part of the outer surface of said mass. By embedding the light source, it can be arranged in a vibration-free and moisture tight manner in the surrounding mass which, when suitably designed, can be readily mounted, whilst due to the presence of the reflecting body, the radiation emitted by the source in various directions is concentrated and supplied in one direction of emission. The radiation losses remain very low if it is ensured that the transparent mass is in optical contact with the reflective surface of the reflecting body.

The transparent mass used is preferably a synthetic resin, for example, a suitable casting resin comprising two constituents, in which the source of radiation can be readily embedded.

In one embodiment of the source of radiation according to the invention, this source includes a semiconductor plate which is arranged in the reflecting body so that the optical axis of said body lies in or parallel to one of the large side faces of the semiconductor plate. As a result of this arrangement, the quantities of light emitted on either side of the semiconductor plate are concentrated uniformly by the reflective surface.

The reflecting body may have the form of a reflector housing or of a layer applied to the surface of the transparent mass by mirror-coating.

The invention will be briefly described with reference to one embodiment shown in the drawing.

The drawing shows a known gallium-phosphide light source which has a semiconductor plate 1 and two electrodes 3 and 4 to which are connected to very thin current conductors 5 and 6. Reference numeral 7 designates the fairly irregular periphery of the semiconductor plate 1.

This very vulnerable light source is arranged in a conical reflector 8 which has lead-in apertures 9 and 10 through which merge the conductors 5 and 6. The reflector is moreover internally mirror-coated in a manner not shown. Furthermore, the semiconductor plate 1 is entirely embedded in a mass 11 of a transparent material which fills completely the reflector 8. The transparent mass used is the synthetic resin which is commercially available under the tradename of "Araldit DRL" and which is particularly suitable for use in casting processes. The manner in which the syntheic resin is cast into the reflector 8 the open side of which is directed upwards, will not be further described.

Before the reflector space is filled with the synthetic resin, the current conductors 5 and 6 are preferably secured in the lead-in apertures 9 and 10, the securing agent consisting of a few drops of an insulating material which seals these apertures in the solidified state. Subsequently, but before the reflector 8 is filled, the position of the semiconductor plate 1 can be corrected so that the semiconductor plate 1 occupies a central position inside the reflector, the semiconduutor plate 1 itself lying in a plane of symmetry passing through the top of the reflector.

It will be appreciated that the invention is not limited to the use of a conical reflector, but that differently shaped reflectors may also be employed.

I claim:
1. A mounting for a source of radiant energy in combination with a plate of gallium phosphide semiconductor material which emits light from a major surface and with electrode connections which comprises:
    embedding means comprising a transparent mass having an index of refraction at least exceeding 1.1 for maintaining said plate in a preselected orientation in said mass,
    means for imposing an inwardly directed conical reflecting surface on a major portion of the exterior of said mass,
    said plate being symmetrically disposed in the interior of said conical reflecting surface and spaced therefrom whereby the major optical axis of said reflecting surface lies in or is substantially parallel to one of the major surfaces of said plate.

2. The combination in accordance with claim 1 wherein said means for imposing an inwardly directed conical reflecting surface on said mass comprise a reflector housing interposed in vibration-free and moisture-free relation to the external surface of said mass.

3. The combination in accordance with claim 2 wherein said transparent mass is cast into said reflector housing.

4. The combination in accordance with claim 1 wherein said means for imposing an inwardly directed conical reflecting surface on said mass comprise an inwardly directed mirror coating layer applied to an external surface of said mass shaped in conical form.

5. The combination in accordance with claim 1 wherein said electrode connections include a pair of electrodes electrically coupled to said plate at positions spaced apart in said plate, each of said electrodes including a contacting lead, said leads separately passing through said mass to connecting terminals external to said reflecting surface through insulating sealing means.

References Cited

UNITED STATES PATENTS

| | | | |
|---|---|---|---|
| 3,290,539 | 12/1966 | Lamorte | 313—108 X |
| 3,304,431 | 2/1967 | Biard et al. | 250—217 |

OTHER REFERENCES

"Gallium Arsenide Light-Emitting Diode," M. M. Roy, IBM Technical Disclosure, vol. 7, No. 1, June 1964, p. 61.

"Mount for Light Emitting Diode," B. Sunners, IBM Technical Disclosure, vol. 8, No. 7, December 1965, p. 1015.

Shah, B. R., "High-Efficiency Electroluminescent Diodes," IBM Technical Disclosure Bulletin, vol. 9, No. 7, December 1969, pp. 947 and 948.

JAMES W. LAWRENCE, Primary Examiner

D. O'REILLY, Assistant Examiner

U.S. Cl. X.R.

317—235